(12) United States Patent
Chen

(10) Patent No.: US 7,721,542 B2
(45) Date of Patent: May 25, 2010

(54) EXHAUST GAS RECIRCULATION MIXER

(75) Inventor: Hua Chen, Blackburn (GB)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/452,854

(22) Filed: Jun. 13, 2006

(65) Prior Publication Data

US 2007/0283698 A1    Dec. 13, 2007

(51) Int. Cl.
F02B 33/44    (2006.01)
F02B 37/00    (2006.01)
F02M 25/07    (2006.01)
F02M 25/06    (2006.01)

(52) U.S. Cl. .................... 60/605.2; 60/611; 123/568.17
(58) Field of Classification Search ............... 60/605.2, 60/611; 123/568.17; 415/58.1, 58.4; F02M 25/07, F02M 25/06; F02B 37/00
See application file for complete search history.

(56) References Cited

U.S. PATENT DOCUMENTS

| | | | | |
|---|---|---|---|---|
| 3,996,748 | A * | 12/1976 | Melchior | 60/605.2 |
| 4,227,372 | A * | 10/1980 | Kakimoto et al. | 60/611 |
| 4,250,711 | A * | 2/1981 | Zehnder | 60/605.2 |
| 4,555,904 | A * | 12/1985 | Melzer et al. | 60/605.2 |
| 4,719,758 | A * | 1/1988 | Sumser | 60/611 |
| 4,720,235 | A * | 1/1988 | Lachance et al. | 415/58.1 |
| 5,025,629 | A | 6/1991 | Woollenweber | 60/602 |
| 5,937,650 | A * | 8/1999 | Arnold | 60/605.2 |
| 6,301,889 | B1 * | 10/2001 | Gladden et al. | 60/605.2 |
| 6,634,174 | B2 * | 10/2003 | Sumser et al. | 60/611 |
| 7,021,058 | B2 * | 4/2006 | Scheinert | 60/611 |
| 7,097,414 | B2 * | 8/2006 | Stangeland | 415/58.4 |
| 7,243,641 | B2 * | 7/2007 | Zukouski | 123/568.17 |
| 7,343,742 | B2 * | 3/2008 | Wimmer et al. | 60/605.2 |
| 2005/0188693 | A1 | 9/2005 | Schmid et al. | |
| 2007/0144170 | A1 * | 6/2007 | Griffith | 60/605.2 |
| 2007/0224032 | A1 * | 9/2007 | Gu et al. | 415/58.4 |
| 2007/0256413 | A1 * | 11/2007 | Marsal et al. | 60/605.2 |
| 2007/0271920 | A1 * | 11/2007 | Marsal et al. | 60/605.2 |
| 2008/0247866 | A1 * | 10/2008 | Sirakov et al. | 415/144 |

(Continued)

FOREIGN PATENT DOCUMENTS

DE    42 13 047 A1    10/1993

(Continued)

OTHER PUBLICATIONS

Machine Translation of DE 4213047 A1, published Oct. 28, 1993.*

*Primary Examiner*—Thai Ba Trieu
(74) *Attorney, Agent, or Firm*—Brian Pangrle

(57) ABSTRACT

An exemplary mixer includes a cylindrical wall having a center axis, a substantially tubular wall defining a volute oriented about the center axis, an inlet to the volute, an exit to the volute provided by one or more openings in the cylindrical wall wherein the volute imparts a tangential velocity component to gas exiting the volute and a mount to mount the mixer to an inlet to a compressor wherein the tangential velocity component imparted by the orientation of the volute is in the intended direction of rotation of a compressor wheel of the compressor. Such a mixer can improve compressor stability, especially where the gas is exhaust gas for exhaust gas recirculation. Other methods, device, systems are also disclosed.

6 Claims, 6 Drawing Sheets

U.S. PATENT DOCUMENTS

2008/0247870 A1 * 10/2008 Sirakov et al. .............. 415/226

FOREIGN PATENT DOCUMENTS

| | | | | |
|---|---|---|---|---|
| DE | 4429232 C1 | * | 9/1995 | |
| JP | 09133052 A | * | 5/1997 | |
| JP | 2006300078 A | * | 11/2006 | |
| WO | WO 9943943 A1 | * | 9/1999 | |
| WO | WO 2006126963 A1 | * | 11/2006 | |

* cited by examiner

TURBOCHARGER
220

TURBOCHARGER SYSTEM
500

EXHAUST GAS RECIRCULATION MIXER

TECHNICAL FIELD

Subject matter disclosed herein relates generally to turbochargers for internal combustion engines and, in particular, technology to introduce positive swirl (or tangential momentum) to a compressor inlet stream.

BACKGROUND

While beneficial for reducing harmful emissions, exhaust gas recirculation (EGR) can affect performance of a turbocharger. More specifically, exhaust gas entering an inlet stream to a compressor can shift the compressor's performance toward a less stable region of a compressor map.

As described herein, imparting positive swirl (or tangential momentum) to an inlet stream to a compressor (in the direction of compressor wheel rotation) can increase compressor stability. Various exemplary techniques include use of a mixer to impart positive swirl to exhaust gas provided to an inlet stream of a compressor for purposes of EGR and compressor stability. Other exemplary methods, devices, and systems are also disclosed.

BRIEF DESCRIPTION OF THE DRAWINGS

A more complete understanding of the various methods, systems and/or arrangements described herein, and equivalents thereof, may be had by reference to the following detailed description when taken in conjunction with the accompanying drawings wherein.

DETAILED DESCRIPTION

Figure 1:
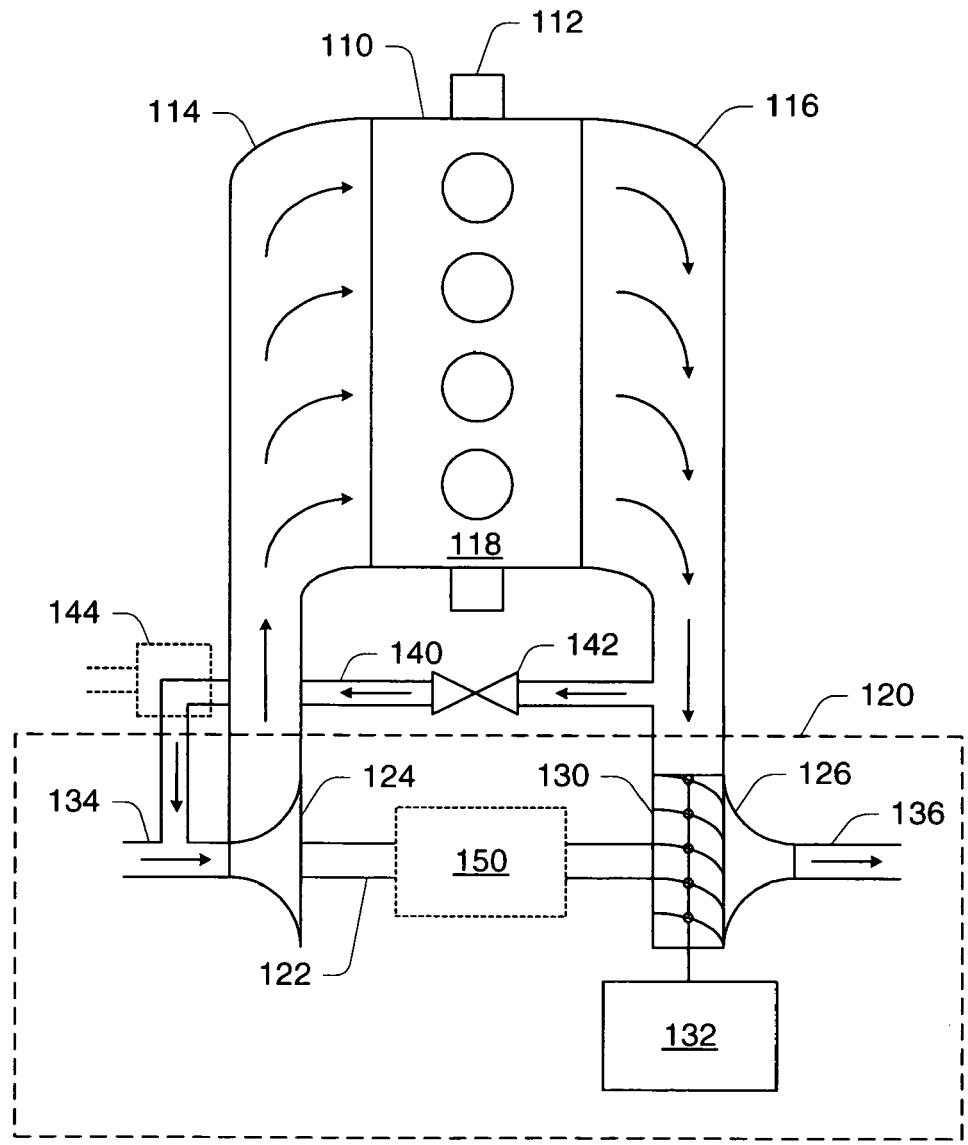
FIG. 1 is a simplified approximate diagram illustrating a prior art turbocharger system.

Turbochargers are frequently utilized to increase the output of an internal combustion engine. Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, and an exhaust outlet 136.

Referring to the turbine 126, such a turbine optionally includes a variable geometry unit 130 and a variable geometry controller 132. The variable geometry unit 130 and variable geometry controller 132 optionally include features such as those associated with commercially available variable geometry turbochargers (VGTs), such as, but not limited to, the GARRETT® VNT™ and AVNT™ turbochargers, which use multiple adjustable vanes to control the flow of exhaust across a turbine.

Adjustable vanes positioned at an inlet to a turbine typically operate to control flow of exhaust to the turbine. For example, GARRETT® VNT™ turbochargers adjust the exhaust flow at the inlet of a turbine rotor in order to optimize turbine power with the required load.

A variety of control schemes exist for controlling geometry, for example, an actuator tied to compressor pressure may control geometry and/or an engine management system may control geometry using a vacuum actuator. Overall, a VGT may allow for boost pressure regulation which may effectively optimize power output, fuel efficiency, emissions, response, wear, etc. Of course, an exemplary turbocharger may employ wastegate technology as an alternative or in addition to aforementioned variable geometry technologies.

The turbocharger 120 optionally includes an electric motor 150 to drive the shaft 122 and thereby rotate a compressor wheel of the compressor unit 124. Technology described herein (e.g., an exemplary mixer) may be optionally used in coordination with an electric motor to control inlet air characteristic to the engine 110 (e.g., temperature, pressure, etc.).

The system 100 also includes a flow path or conduit 140 between the compressor air inlet 134 and the exhaust port 116. Flow in the path 140 is controlled by a valve 142, for example, to allow for exhaust gas recirculation (EGR). This arrangement for EGR is sometime referred to as "long route" EGR; compared to shorter routes that may introduce exhaust into the inlet stream downstream from the compressor 124. One or more additional components may provide for cooling of the exhaust (e.g., heat exchanger 144).

While EGR can be beneficial in reducing emission of certain chemical species, EGR typically shifts the engine running line (the lugline) on a compressor map to the left toward a more unstable operating region of the compressor map. The shift increases with increasing amount of recirculation gas.

Figure 2:
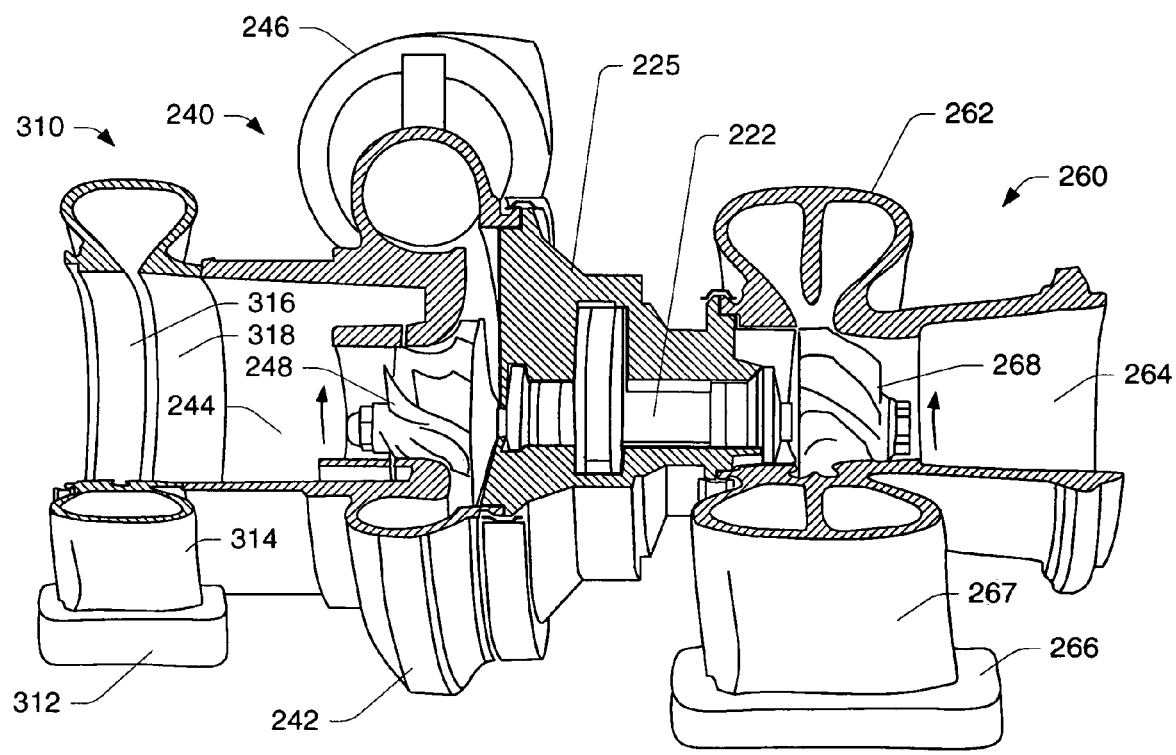
FIG. 2 is a cut-away view of a turbocharger system that includes an exemplary mixer for introducing gas to a compressor inlet.

FIG. 2 shows a cut-away view of a turbocharger assembly 220 suitable for use as the turbocharger 120 of FIG. 1. The assembly 220 includes a compressor unit 240, an exhaust turbine unit 260 and an exemplary mixer 310. The compressor unit 240 includes a compressor housing 242 having an air inlet portion 244 and an air outlet portion 246. The compressor housing 242 houses a compressor wheel 248 and defines a volute or scroll that acts in conjunction with the wheel 248 to compressor inlet air.

The exhaust turbine unit 260 includes a turbine housing 262 having an exhaust outlet portion 264 and a flange 266 associated with an exhaust inlet portion 267. The turbine housing inlet flange 266 often acts as the reference point for fixing turbocharger position relative to its installation and acts as the main load bearing interface for the turbocharger 220. The turbine housing 262 houses a turbine wheel 268 and defines one or more volutes that act to direct exhaust gas from the exhaust inlet to the wheel 268.

A shaft 222, which may be a multi-component shaft, operably connects the turbine wheel 268 and the compressor wheel 248 for rotation about the z-axis. A center housing 225 houses at least a portion of the shaft 222 and connects the compressor housing 240 and the turbine housing 260. As described herein, a housing (e.g., compressor, turbine, center, etc.) may be a multi-component housing.

Intended direction of rotation of the compressor wheel 248 and the turbine wheel 268 is indicated as the mixer 310 is configured with respect to this intended direction of rotation. In the example of FIG. 2, the mixer 310 mounts directly to the compressor housing 242. In other examples, a spacer (or other component) may be used between a compressor housing and an exemplary mixer.

The mixer 310 includes an exhaust gas inlet mount 312 joined to a substantially tubular wall 314 that defines a volute. The tubular wall 314 joins a substantially cylindrical upstream wall 316 (e.g., air inlet side) and a substantially cylindrical downstream wall 318 (e.g., compressor side) that define an opening or slot 315 that allows gas to exit the volute. The terms upstream and downstream refer to upstream the opening 315 (e.g., air inlet side) and downstream the opening 315 (e.g., compressor side). Gas exiting the opening 315 enters the compressor unit 240 via the air inlet portion 244 of the compressor housing 242. In this example, the downstream wall 318 attaches to the air inlet portion 244 of the compressor housing 242 via an attachment mechanism (e.g., threaded mechanism, flanged mechanism, welded, press-fit mechanism, etc.).

While the opening 315 may be less than 360° (e.g., along the entire inner circumference of the mixer 310 or about the z-axis), a circumferential opening of about 360° can help to deliver gas more evenly to the compressor unit 240. A circumferential opening can provide for good mixing ability and can deliver tangentially uniform flow to the compressor. A mixer may include a spiral opening that may be less than, equal to, or greater than 360° (e.g., where the volute has a spiral shape).

In an alternative arrangement, a compressor housing may include a mixer. For example, the inlet portion 244 of the housing 242 may include an upstream wall and a downstream wall that define one or more openings for exhaust gas provided by a volute. A tubular wall defining the volute may be integral with the inlet portion 244 or may be attachable to the inlet portion 244 for delivery of gas via the opening or openings.

As already mentioned, the mixer 310 is configured with reference to the intended direction of rotation of the compressor wheel. In operation, the mixer 310 generates a positive swirl as exhaust gas exits the volute where the positive swirl is in the same direction as the intended direction of compressor wheel rotation. The positive swirl, as imparted to the mixture of the air and the gas, modifies angle of incidence at inducer portion of the compressor wheel, enabling the compressor to operate more stably.

An exemplary mixer can use a scroll or volute similar to that of a turbine housing to create the swirl and, for example, to circumferentially distribute the gas uniformly. As already mentioned, a mixer may be used in conjunction with an electric motor to regulate inlet air to an internal combustion engine. For example, an EGR mixer and an electric motor may be used to ensure stable flow at the inducer portion of a compressor wheel. An electric motor may be used to accelerate or decelerate rotational speed of a compressor wheel. A controller may provide for coordinated control of EGR and an electric motor to maintain flow stability at a compressor wheel. An exemplary EGR mixer may be controlled in a coordinated manner with a variable geometry turbine (see, e.g., the unit 132 of FIG. 1). For example, an exhaust valve for controlling flow to an exemplary mixer may receive a control signal from a controller that also controls vane geometry of a variable geometry exhaust turbine.

The aforementioned mixer 310 of FIG. 2 pertains to a particular implementation that references various components of a conventional turbocharger. In another example, an exemplary mixer includes a cylindrical wall having a center axis, a substantially tubular wall defining a volute or scroll oriented about the center axis, an inlet to the volute or scroll (e.g., a volute inlet or a scroll inlet), an outlet to the volute or scroll (e.g., a volute outlet or a scroll outlet) provided by one or more openings in the cylindrical wall where the volute or scroll imparts a tangential velocity component to gas exiting the volute or scroll via the outlet and a mount or attachment mechanism to mount or to attach the mixer to an inlet to a compressor (e.g., a compressor inlet) where the tangential velocity component imparted by the orientation of the volute is in the intended direction of rotation of a compressor wheel of the compressor.

A volute or scroll may be oriented about a center axis in a clockwise or counter-clockwise direction (e.g., clockwise spiral or counter-clockwise spiral). Thus, where the intended direction of rotation of a compressor wheel is clockwise, then the volute or scroll of the mixer will impart a tangential velocity component or positive swirl in a clockwise direction.

Figure 3:
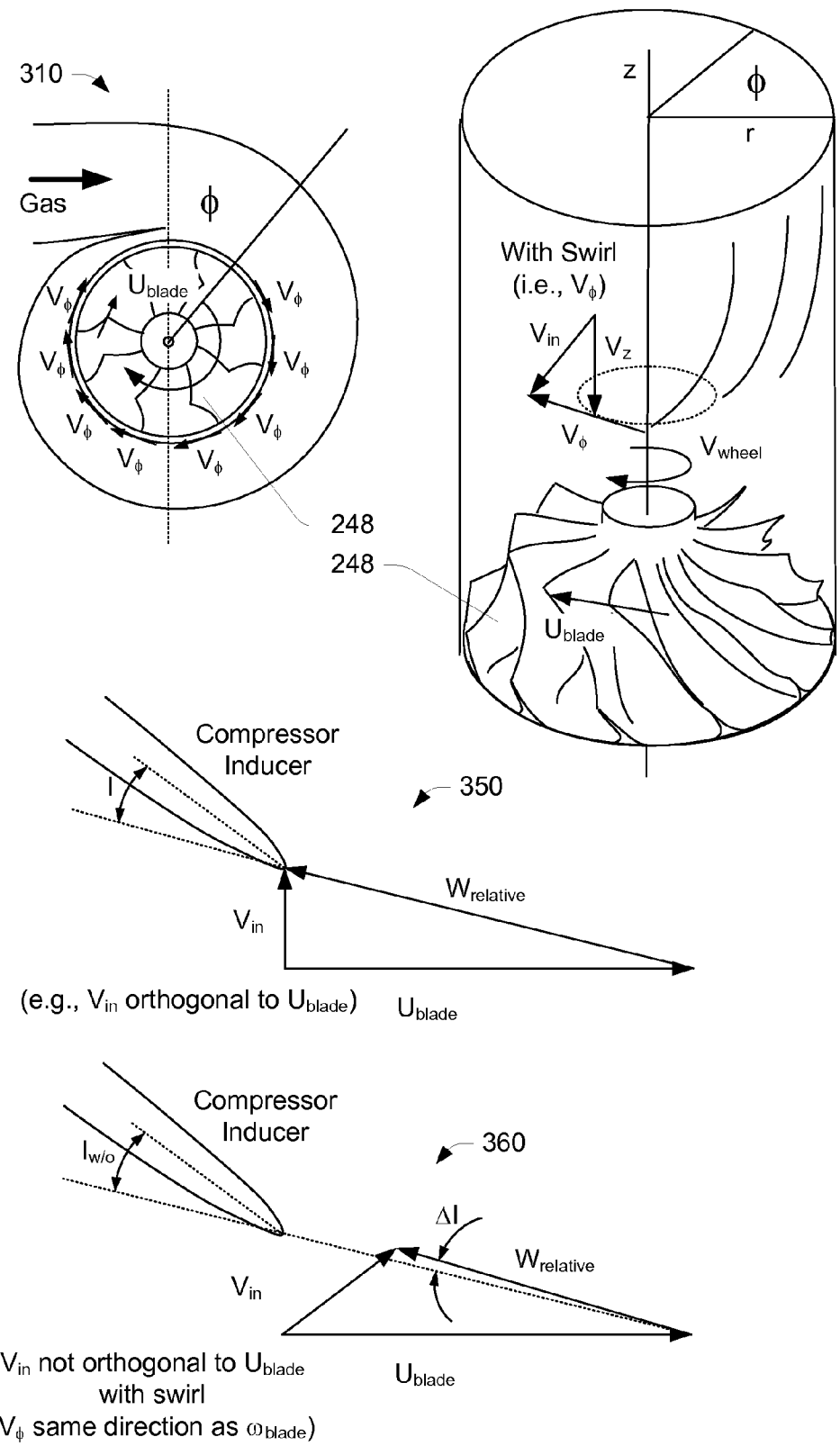
FIG. 3 is a top view of a mixer, with reference to rotational direction of a compressor wheel, and velocity plots with and without positive swirl.

FIG. 3 shows a simplified top view of an exemplary mixer 310 and two velocity plots 350, 360 that reference a compressor wheel blade, more specifically, an inducer portion of a compressor wheel blade. Incoming fresh air, being drawn in by the compressor, flows in a direction substantially along the axis of rotation of the compressor wheel (e.g., into the page with respect to the mixer 310 of FIG. 3) while exhaust gas flows through the volute in a direction tangentially to the air flow (clockwise, same direction as rotation of the compressor wheel). In such a configuration, conservation of the tangential momentum leads to an increase of the tangential velocity of the exhaust gas when it moves down to the volute to exit at a smaller radius to meet the air flow. The cross-sectional area (A) and the centroid radius (R) of the volute throat (at phi angle, $\phi=0$) are parameters relevant to the gas flow angle in the tangential direction. Mixture of the exhaust gas and the air carries the tangential momentum to the compressor wheel inlet. Parameters A and R of the volute (e.g., with respect to $\phi$) may be selected to provide a desired tangential velocity or positive swirl.

The plots 350, 360 show velocity triangles without (350) and with (360) positive swirl at the inducer portion of a compressor wheel blade. In the plots 350, 360, $V_{in}$, is the inflow velocity, $U_{blade}$ is the blade speed and $W_{relative}$ is the relative velocity. As indicated, the positive swirl (see, e.g., change in $V_{in}$) reduces the incidence angle (I), which acts to stabilize flow at the inducer portion of the blade. Without the positive swirl (see, e.g., the plot 350), when a compressor is operated at low mass flow rate region, the reduction of inlet absolute velocity results in a positive incidence angle at the inlet (I>0), this eventually leads to flow separation from the inducer suction surface and flow instability. With positive swirl (see, e.g., the plot 360 and the inflow velocity $V_{in}$), the positive incidence angle is reduced ($\Delta I$) and the compressor remains stable (e.g., compare the incidence angle without positive swirl, $I_{w/o}$, to the reduction in the incidence angle, $\Delta I$, associated with the relative velocity, $W_{relative}$, for the positive swirl). The exemplary mixer 310 can also self regulate where positive swirl increases as the amount of EGR increases.

As shown in FIG. 3, the gas enters the mixer 310 and the volute generates tangential momentum, as indicated by the tangential velocity components V. The compressor wheel 248 includes an inducer portion where inducer blades have a blade velocity $U_{blade}$. As the compressor wheel 248 rotates, the blade velocity $U_{blade}$ is a tangential velocity, as depicted with respect to a cylindrical coordinate system. As indicated, the axial velocity component $V_z$ is orthogonal to $U_{blade}$. If incoming air has no swirl, the blade velocity $U_{blade}$ and the axial velocity $V_z$ determine the angle of incidence that the leading edge of the inducer blades (see, velocity triangle 350, which also depicts the relative velocity $W_{relative}$). As described herein, the mixer 310 generates tangential momentum and hence a tangential velocity component $V_\phi$. As depicted with respect to the cylindrical coordinate system, the tangential velocity component $V_\phi$ adds to $V_z$. Hence, with swirl in the direction of rotation of the wheel 248, the angle of incidence is reduced (see, velocity triangle 360, which also depicts the relative velocity $W_{relative}$).

Figure 4:
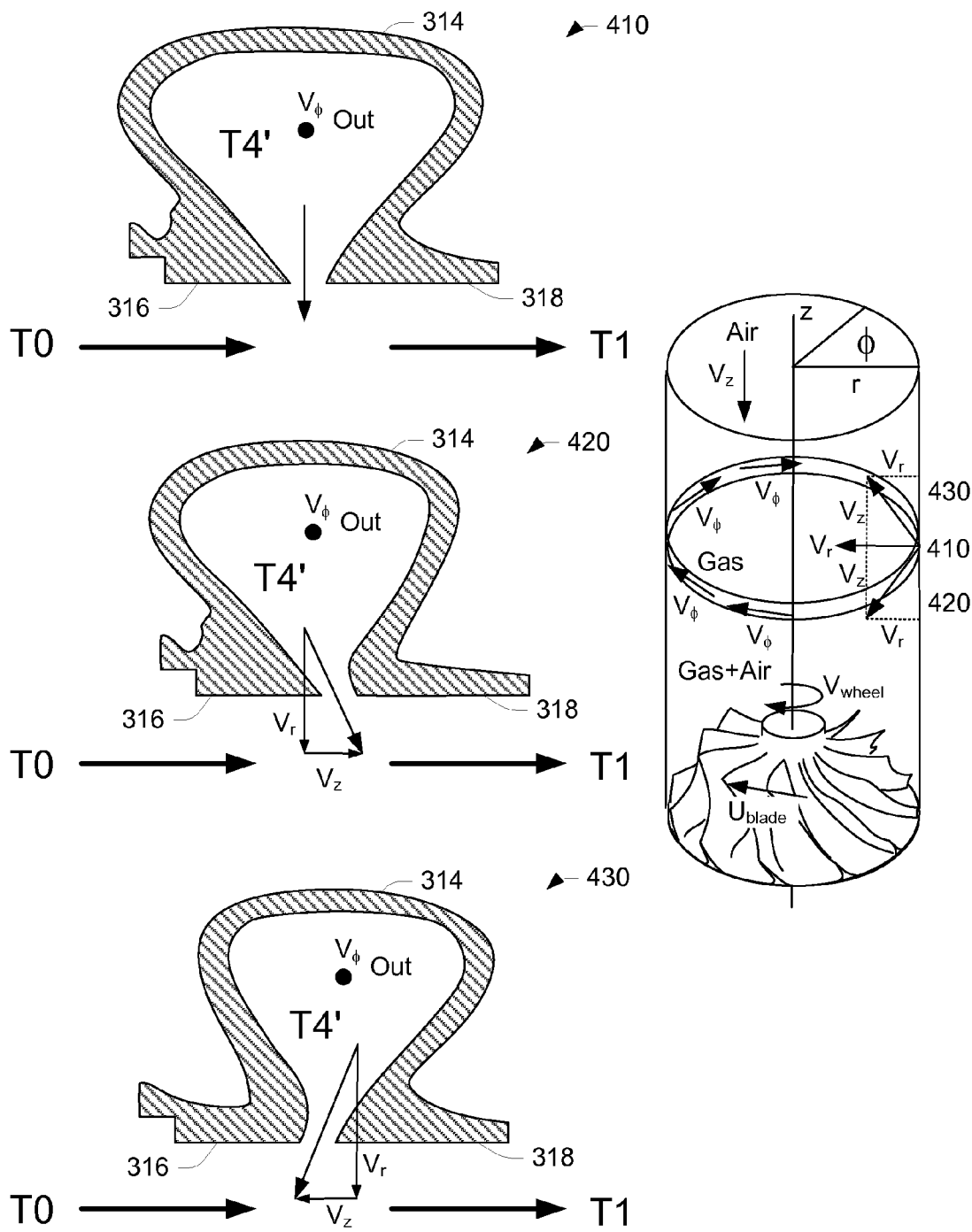
FIG. 4 is a series of volute cross-sectional views with respect to an inlet flow direction.

FIG. 4 shows various opening configurations 410, 420, 430 for an exemplary mixer. A temperature T4' is also shown, which is described with respect to FIG. 5. The configurations 410, 420, 430 are illustrated with respect to mixer walls 314, 316, 318 and opening 315. The flow direction at the opening 315 (e.g., volute outlet) in the meridional plan can be used to influence the mixing process and to influence compressor stability. The configurations 410, 420, 430 refer to a parameter Θ (opening angle with respect to z-axis) and a parameter Δz (axial width). These parameters affect radial and axial velocity of gas exiting the opening 315 and may be selected to influence mixing and compressor performance. These parameters may be relatively constant or vary (e.g., as a function of φ). The opening configuration 410 (Θ~90°) aims to minimize the velocity component in axial direction (z-axis). The opening configuration 420 (Θ>90°) aims to generate an axial velocity component in the same direction as the air flow, which can help improve compressor stability as the flow inside the compressor is less likely to flow back against a stronger incoming flow. The opening configuration 430 (Θ<90°) aims to generate an axial velocity component opposite to that of the opening configuration 410; hence, the configuration 430 can improve mixing of exhaust gas and inlet air to the compressor.

FIG. 4 also shows the tangential velocity component $V_\phi$ in the volute 314 as pointing out of the page. A diagram with respect to a cylindrical coordinate system depicts the opening and the vectors corresponding to the configurations 410, 420 and 430. As indicated, the configurations 410, 420 and 430 do not alter the tangential component of velocity $V_\phi$. The configurations 410, 420 and 430 pertain only to the radial and axial velocity components.

Figure 5:
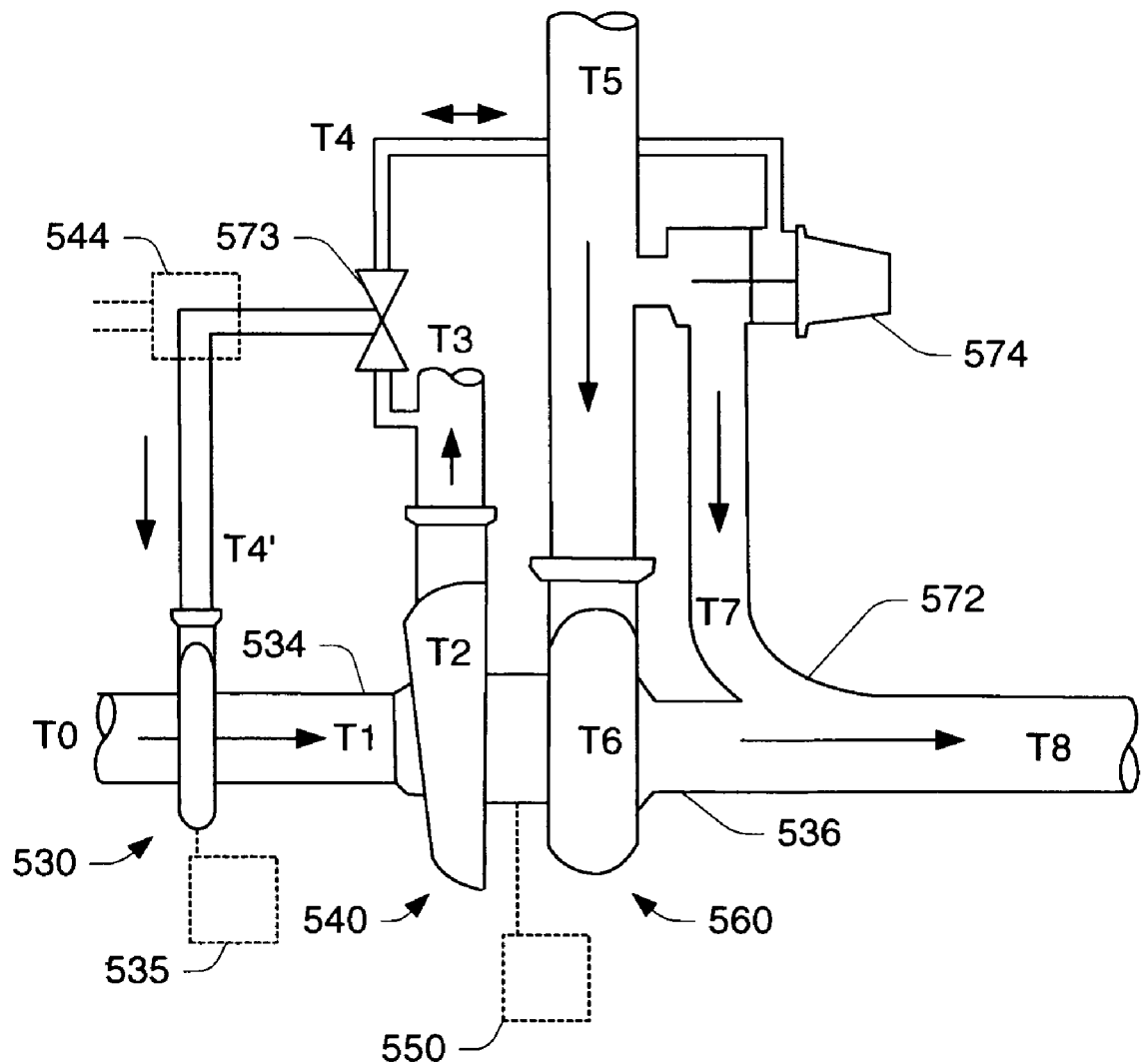
FIG. 5 is a simplified approximate diagram illustrating an exemplary turbocharger system that includes a mixer for EGR.

FIG. 5 shows an exemplary turbocharger system 500 where various temperatures (T0-T8) are shown. Arrows indicate the direction of air flow or exhaust flow. In general, the lowest temperature is that of ambient air (T0) at the inlet conduit 534 to the compressor assembly 540. The compressor assembly 540 acts to increase the air temperature such that T2 exceeds T0 and T1. Compressed air exiting the compressor 540 has a temperature T3, which is typically the same as T2.

The system 500 includes an exemplary mixer 530 for introducing exhaust gas to the inlet 534 of the compressor assembly 540. The exhaust entering the mixer 530 has a temperature T4', which may be approximately the same as T4. An optional heat exchanger 544 may be used to alter T4', for example, to cool the exhaust to a temperature less than T4. Where the exhaust is to be cooled, parameters defining the mixer 530 may account for cooling and the increased density of the exhaust. Where the mixer 530 has one or more adjustable components, adjustment of such component(s) may be achieved by an actuator or controller 535 that optionally receives one or more signals from an engine control unit (ECU) or other controller, sensor or actuator. A mixer with an adjustable component is described with respect to FIG. 7 and, as explained with respect to FIG. 7, an adjustable component may be capable of regulating exhaust flow to the compressor inlet 534.

The system 500 includes a valve 573 that can adjust air flow to the exhaust stream or, more commonly, flow from the exhaust stream to the inlet stream (e.g., exhaust gas recirculation or "EGR"). The valve 573 may be controlled by an engine control unit (ECU) or other controller (e.g., the controller 535, the controller 550, etc.). Another valve 574 may be a wastegate valve or an EGR valve that allows at least some exhaust to bypass the turbine assembly 560 for purposes of reducing exhaust flow to the turbine assembly 560 or for purposes of EGR. The valve 574 may be controlled by an engine control unit (ECU) or other controller (e.g., the controller 535, the controller 550, etc.).

The turbine assembly 560 typically receives at least some exhaust from the engine, which, again, is at temperature T5. In general, T5 is the highest temperature in the system 500. The temperature of the turbine assembly 560, T6, is generally less than that of the exhaust (i.e., T6<T5) because the turbine assembly 560 extracts energy from the exhaust and also because some lubricant cooling may be provided as well. Hence, where the wastegate valve 573 is closed (i.e., no bypass flow), the temperature T8 of exhaust exiting the turbine 560 via the conduit 536 is less than T5 as well.

The system 500 illustrates various mechanisms for use in temperature control of an exhaust turbine assembly 560 and for EGR of an internal combustion engine (e.g., the engine 110 of FIG. 1). Some of the mechanisms may be based on mixing while others may act to alter combustion reactions, turbocharger operation (e.g., compressor performance), etc., which may maintain or change exhaust temperature (e.g., amount of EGR can affect exhaust temperature T5).

The system 500 optionally includes one or more temperature sensors. For example, measurement of temperatures T0, T5 and T8 can provide information as to turbocharger efficiency and performance. As discussed herein, temperature measurements may be used to control EGR (e.g., amount, cooling of exhaust, etc.) and hence flow to an exemplary mixer (e.g., the mixer 530).

The system 500 optionally includes an electric motor and/or generator controlled by a controller 550. As already mentioned, such a unit may be used in conjunction with other features (e.g., the mixer, EGR valve, wastegate, ECU, etc.) to control performance of the turbocharger for an internal combustion engine. While the system 500 shows an EGR branch in communication with a wastegate branch, the system 100 of FIG. 1 shows a different configuration for EGR. As described herein, any of a variety of EGR configurations may be suitable to provide exhaust to a mixer.

Figure 6:
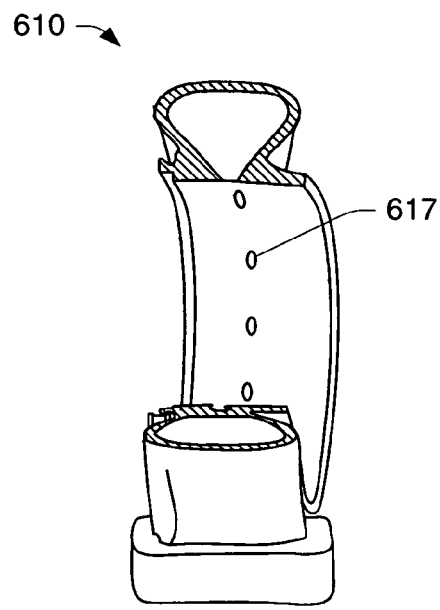
FIG. 6 is cut-away view of an exemplary mixer that includes a series of orifices.

FIG. 6 shows an exemplary mixer 610 that includes a series of orifices 617 to direct gas flow from a volute. The orifices 617 may be machined at an angle to a radial line from a center axis (z-axis) of the mixer 610. For example, the orifices 617 may be machined at an angle generally in a tangential direction provided by the volute. Alternatively, vanes may be used in the slot opening of the mixer 310 of FIG. 2 to promote tangential flow. Such vanes may be adjustable to control the angle. Such vanes may be positionable to achieve flow akin to the opening configurations 410, 420, 430 of FIG. 4. The optional actuator or controller 535 of FIG. 5 may provide for adjustment of vanes.

Figure 7:
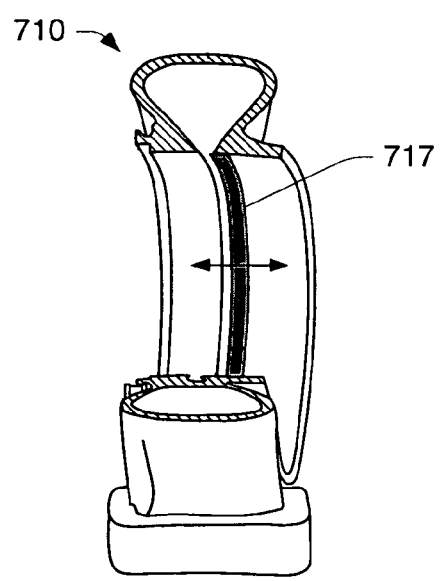
FIG. 7 is a cut-away view of an exemplary mixer that includes a movable element to adjust flow from the mixer to a compressor inlet.

FIG. 7 shows an exemplary mixer 710 that includes an adjustable component 717. The adjustable component 717 may be in the form of a cylindrical wall that can be adjusted in the axial direction (z-axis) of the mixer 710. As shown, the component 717 can partially or entirely close an opening 715 of the volute. The optional actuator or controller 535 of FIG. 5 may provide for adjustment of the component 717. Adjustment may occur to decrease EGR or to alter velocity of exhaust exiting the volute of the mixer 710.

While various examples pertain to use of exhaust gas to impart positive swirl (or tangential momentum) to an inlet stream to a compressor, an exemplary mixer may be optionally operated using other gas or air. For example, if the inlet 312 of the mixer 310 was open to the atmosphere, air would be drawn into the volute by the compressor. As the air exits the volute, a positive swirl (or tangential momentum) will be imparted to the inlet stream to the compressor, which can improve compressor stability. More generally, such an arrangement may be used to introduce one or more substances into an inlet stream to a compressor (e.g., a performance enhancing substance, air, exhaust, etc.).

An exemplary method includes drawing gas through a volute to generate a tangential velocity component (tangent to a center axis of the volute), mixing the gas with inlet air to a compressor to thereby stabilize flow at an inducer portion of a compressor wheel of the compressor where the tangential velocity component and the intended direction of rotation of the compressor wheel are in the same direction about the center axis, compressing the gas and inlet air mixture and providing the gas and inlet air mixture to an internal combustion engine. Such a method may use exhaust gas for exhaust gas recirculation of an internal combustion engine.

Although some exemplary methods, devices, systems, etc., have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A mixer comprising:
    a cylindrical wall having a center axis;
    a substantially tubular wall defining a volute oriented about the center axis;
    an inlet to the volute to receive exhaust gas;
    an exit from the volute provided by one or more openings in the cylindrical wall wherein the volute imparts a tangential velocity component to the exhaust gas exiting the volute;
    a mount to mount the mixer to an air inlet to a radial compressor wherein the tangential velocity component imparted by the orientation of the volute is in the intended direction of rotation of a compressor wheel of the radial compressor to reduce the angle of incidence of the air and the exhaust gas at the leading edges of inducer blades of the compressor wheel and wherein the one or more openings of the exit from the volute are configured to direct the exhaust gas exiting the volute axially away from the compressor wheel at an angle less than 90° to the cylindrical wall to enhance mixing of air and exhaust gas; and
    an adjustable component positioned adjacent to the one or more openings to alter velocity of the exhaust gas exiting the volute by partially or entirely closing the one or more openings.

2. A compressor housing for a radial compressor comprising:
    a portion for housing a compressor wheel; and
    a mixer portion that comprises
        a cylindrical wall having a center axis;
        a substantially tubular wall defining a volute oriented about the center axis;
        an inlet to the volute to receive exhaust gas;
        an exit from the volute provided by one or more openings in the cylindrical wall to an air stream wherein the volute imparts a tangential velocity component to the exhaust gas exiting the volute and wherein the tangential velocity component imparted by the orientation of the volute is in the intended direction of rotation of the compressor wheel to reduce the angle of incidence of the air and the exhaust gas at the inducer blades of the compressor wheel and wherein the one or more openings are configured to direct the exhaust gas exiting the volute axially away from the compressor wheel at an angle less than 90° to the cylindrical wall to enhance mixing of air and exhaust gas; and
    an adjustable component positioned adjacent to the one or more openings to alter velocity of the exhaust gas exiting the volute by partially or entirely closing the one or more openings.

3. The mixer of claim 1 or claim 2 wherein the exhaust gas comprises exhaust gas for exhaust gas recirculation to an internal combustion engine.

4. The mixer of claim 1 or claim 2 wherein the tangential velocity component of the exhaust gas acts to stabilize flow at the leading edges of the inducer portion blades of the compressor wheel.

5. A turbocharger comprising:
    a turbine unit;
    a radial compressor unit; and
    a mixer unit that comprises
        a cylindrical wall having a center axis;
        a substantially tubular wall defining a volute oriented about the center axis;
        an inlet to the volute to receive exhaust gas;
        an exit from the volute provided by one or more openings in the cylindrical wall to an air stream wherein the one or more openings are configured to direct the exhaust gas exiting the volute axially away from the compressor wheel at an angle less than 90° from the cylindrical wall to enhance mixing of air and exhaust gas, wherein the volute imparts a tangential velocity component to the exhaust gas exiting the volute and wherein the tangential velocity component imparted by the orientation of the volute is in the intended direction of rotation of a compressor wheel of the compressor unit compressor to reduce the angle of incidence of the air and exhaust gas at the leading edges of inducer blades of the compressor wheel; and
    an adjustable component positioned adjacent to the one or more openings to alter velocity of the exhaust gas exiting the volute by partially or entirely closing the one or more openings.

6. The turbocharger of claim 5 wherein the exhaust gas drives the turbine unit.

* * * * *